United States Patent [19]
Saetti

[11] 3,750,757
[45] Aug. 7, 1973

[54] CONTROL DEVICES FOR AGRICULTURAL TRACTOR IMPLEMENTS
[75] Inventor: Renato Saetti, Turin, Italy
[73] Assignee: FIAT Società per Azioni, Turin, Italy
[22] Filed: May 18, 1972
[21] Appl. No.: 254,671

[30] Foreign Application Priority Data
May 27, 1971 Italy.............................. 68781 A/71

[52] U.S. Cl...................... 172/9, 172/294, 172/439, 280/461 A, 91/412
[51] Int. Cl.......................................... A01b 63/112
[58] Field of Search......................... 172/9, 7, 10–12, 172/439, 445, 448, 294; 280/460 A, 461 A, 479; 60/52 HE; 91/411, 412

[56] References Cited
UNITED STATES PATENTS
3,529,852  9/1970  Kellington....................... 280/461 A
3,666,019  5/1972  Yeske................................ 172/294
3,627,053  12/1971  Hook...................................... 172/9
R25,512  1/1964  Presnell et al......................... 172/9

Primary Examiner—Robert E. Pulfrey
Assistant Examiner—Stephen C. Pellegrino
Attorney—Richard C. Sughrue, Robert V. Sloan et al.

[57] ABSTRACT

A control arrangement for a three point coupling of the type provided on the rear of tractors for the connection of agricultural implements is disclosed. The control arrangement comprises independent hydraulic actuators for each of the three points of the three point coupling. The hydraulic actuators are independently operable and the control arrangement includes means interconnecting two of the actuators to control the transverse inclination of an implement connected to the coupling, both automatically and under the control of a selector device for selecting a desired inclination. The control device can also adjust the height of the implement and the longitudinal inclination in addition to being operable to allow the implement to 'float' with no vertical or transverse control, to follow the surface of the ground over which it is drawn.

16 Claims, 7 Drawing Figures

CONTROL DEVICES FOR AGRICULTURAL TRACTOR IMPLEMENTS

BACKGROUND OF THE INVENTION

The present invention relates to a device for controlling implements connected to agricultural tractors.

Agricultural equipment which is connected to tractors is generally raised and lowered by an hydraulic control device carried by the tractor and usually termed the "hydraulic lift." The vertical adjustment of the implements is effected by movement of two draw-rods, at least one of which is manually adjustable, which act upon two lower pivoted arms of a three-point coupling arrangement comprising the above mentioned pivoted arms and an adjustable stay rod. The draw-rods are each connected to a lever which is keyed to a transverse axle about which it can be turned by one or more hydraulic actuators which are generally incorporated, together with the axle, in a single casing of the lift located above the rear end of the transmission casing; this arrangement occupies a considerable amount of space.

The adjustable stay rod is normally connected to a dynamometric device capable of detecting the forces which act on the implement in a direction parallel to the axis of movement of the tractor, and forming part of a control device which enables the implement to be drawn under conditions of so-called controlled forces. Similarly, it is possible to control the vertical position of the implement to achieve operation under conditions of controlled position. Known hydraulic lifts are also capable of effecting transfer of the load as will be described below, and can regulate the angle of inclination of the implement with respect to the ground, control the transverse trim of the implement and render it "floating" in the transverse direction, as will be more fully described below.

Thus, in detail, known hydraulic lifting arrangements can be operated to achieve the following:

a. lifting and lowering of the implement by means of continuous displacement of manual position-controlling levers:

b. maintaining the implement in a determined position; this can be effected by means of a pivoted lever to each of a number of positions of which there corresponds a given position of the implement, with respect to the tractor:

c. controlling the force on the implement; this is achieved, as mentioned above, by means of a dynamometric device which is adjusted by means of suitable levers and which provides a selected traction force on the implement (corresponding to the depth of work desired), the device operating automatically to increase the depth which the implement penetrates into the ground if the traction force tends to decrease and raising the implement to reduce such penetration if the traction force tends to increase;

d. adjustment of the angle of inclination of the implement with respect to the ground; this is effected by means of a lever which acts on the adjustable stay rod to vary the length thereof, the length of the stay rod determining the inclination of the implement with respect to the ground. It is also known to use for this purpose an hydraulic actuator installed in place of the adjustable stay rod.

e. adjustment of the transverse trim of the implement; this involves effecting lateral inclination of the implement to adapt its trim to the slope or other features of the ground. The required inclination of the implement with respect to the tractor for work on sloping ground has the effect of putting the implement in normal trim with respect to the ground. This adjustment is normally effected by adjusting the appropriate draw rod.

f. floating the implement in the transverse direction. This consists in allowing the implement to rest on the ground and move laterally to follow any transverse variations of profile. This is effected by disengaging the draw rods used for adjustment of the transverse trim, or by disengagement of part of the implement.

g. transfer of the load from the implement to the tractor. This is achieved by adjusting the hydraulic pressure in the supply circuits of the hydraulic lifter in such a way that the lifter does not raise the implement from the ground but is subjected to a load due to the weight of the implement and dependent on the adjustment of the pressure in the hydraulic circuit of the lifting device. Such transfer of the load promotes adherence of the driving wheels of the tractor to increase the traction when required.

OBJECTS OF THE INVENTION

One object of the present invention is to provide a lifting arrangement for implements connected to tractors which is capable of performing all the operations described above.

Another object of the present invention is to provide a lifting arrangement for implements connected to tractors in which the transverse axle, the manually operated control levers of the draw-rods, which are keyed to the transverse axle and the casing of the known lifter devices, are all dispensed with.

A further object of the present invention is to provide a lifting arrangement for implements connected to tractors in which there is a substantial saving of space.

Yet another object of the invention is to provide a lifting arrangement for implements connected to tractors in which all the control and adjustment operations, including the adjustment of the transverse trim and of the inclination of the implement, can be effected hydraulically from the driving cabin, thereby avoiding the necessity for direct manual operation by the driver.

Yet a further object of this invention is to provide a lifting arrangement for implements connected to tractors which allows the production of tractors having a driving cabin which is completely closed, even at the rear end which does not need to be accessible for adjustment from the cabin which may thus be moved to a position substantially further forward than has hitherto been possible. The transfer to a forward position of the driving cabin and the elimination of the casing of the lifter device allow space for the installation of a fuel tank of high capacity behind the driving cabin, thus increasing the length of time for which the tractor can be used between stops for refuelling. Also, in the forward position the driving cabin is more easily accessible. By reducing the number of elements in the control chain of the lifter device, the efficiency of the transmission is improved over known lifter devices.

SUMMARY OF THE INVENTION

According to the present invention, there is provided a control device for a three-point coupling arrangement of an agricultural tractor characterised in that it comprises two hydraulic actuators for controlling the angular position of two pivoted lower arms of the three-point coupling arrangement and a third hydraulic actuator operative as an adjustable stay rod, the actuators of the lower arms being hydraulically connected in series in such a manner that upon movement of one of the actuators there is a transfer of fluid between the two actuators to cause the other actuator to move also, the volume of fluid transferred from one actuator to the other being variable to vary the relative inclination of the lower arms, and there being provided independent distributor valves for selectively controlling the feeding of fluid to the actuators of the lower arms and to the stay rod actuator.

Various other features and advantages of the invention will become apparent during the course of the following description with reference to the accompanying drawings which is given purely by way of non-restrictive example.

BRIEF DESCRIPTION OF THE DRAWINGS

In the drawings corresponding parts are indicated with the same reference numerals throughout.

DESCRIPTION OF THE PREFERRED EMBODIMENT

Figure 1:
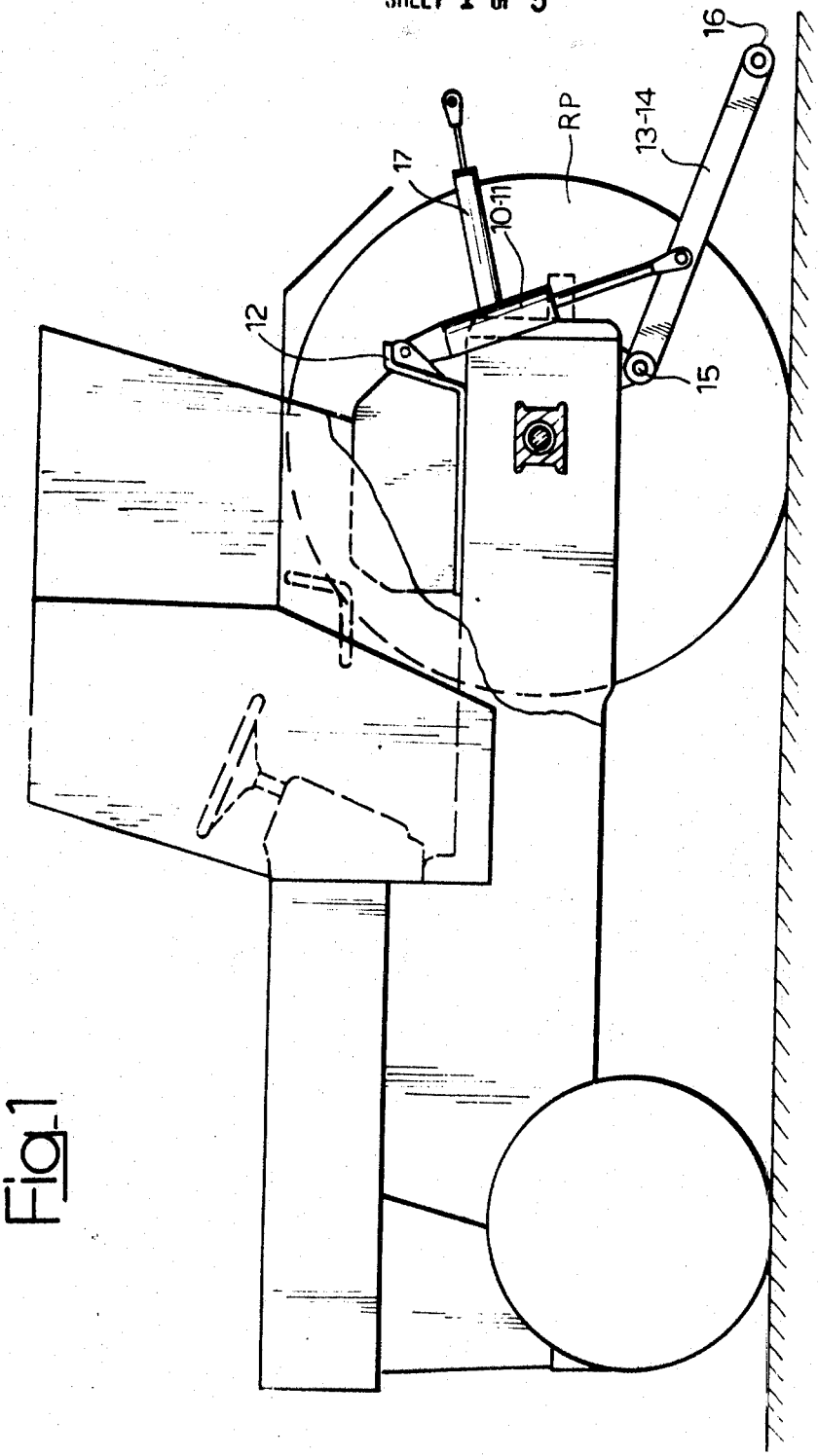
FIG. 1 is a diagrammatic side view of a tractor provided with a lifting device constructed as an embodiment of the present invention.
Figure 2:
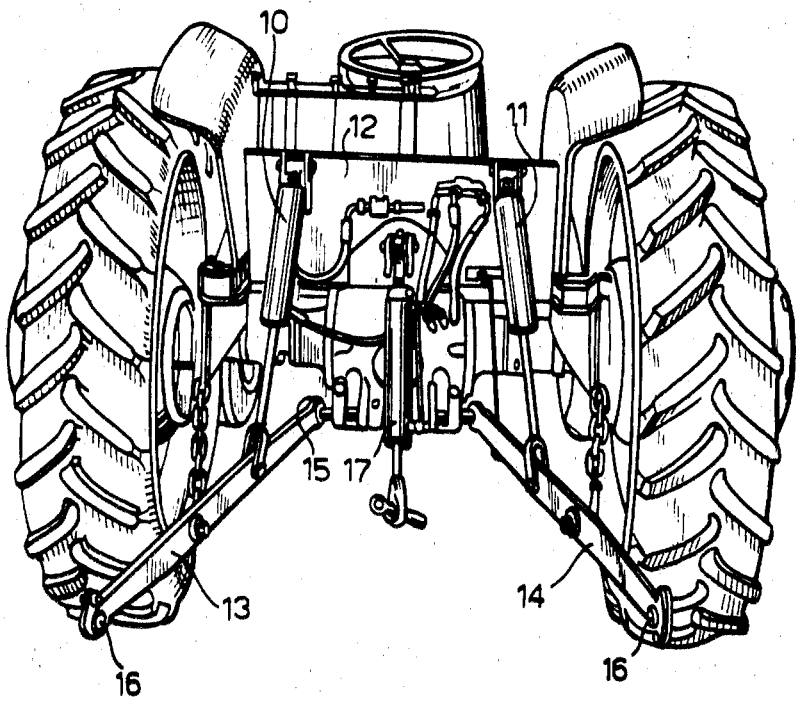
FIG. 2 is a rear view of the tractor shown in FIG. 1 illustrating the lifting device.

Referring now to the drawings the hydraulic lifting arrangement comprises two extensible hydraulic actuators 10 and 11 the upper ends of which are pivoted to a strong connecting flange 12 fixed to the rear of the tractor in a position slightly to the rear of the axle tree of the rear wheels RP. The shaft of each actuator 10, 11 is pivoted at the lower end to a respective arm 13, 14 of the so-called three-point coupling arrangement; the arms 13, 14 are pivoted to the rigid structure of the tractor about a horizontal axis 15 and are each provided with an eyelet hole 16, 16a at the end for connection of the agricultural implement to be drawn by the tractor and controlled by the hydraulic lift.

Between the connecting points of the actuators 10 and 11 to the flange 12 and slightly below these points there is pivoted a third extensible hydraulic actuator 17. The shaft of the actuator 17 has a terminal eyelet hole providing the third attachment point for connection of an agricultural implement. The actuators 10 and 11 operate to raise and lower the arms 13, 14, to support the weight of the implement when it is being carried off the ground, and to adjust the transverse trim of the implement. The actuator 17 which replaces the stay rod of known hydraulic lifts, operates to adjust the inclination of the implement with respect to the ground and also serves as a dynamometric device to detect and transmit the force variations on the implement during the work.

The actuators 10, 11 are hydraulically connected together in series. More precisely, the pistons of each actuator separate the respective cylinder, into lower chambers 10a, 11a and upper chambers 10b, 11b. A conduit 18 connects the top chamber 10b of the actuator 10 hydraulically to the lower chamber 11a of the actuator 11.

Thus, upward displacement of the piston of the actuator 10 causes a transfer of fluid through the conduit 18 to the chamber 11a of the actuator 11 and a consequent corresponding raising of the piston of the actuator 11. As will be described in greater detail below the arrangement is also such that by varying the volume of fluid in the chambers 10b and 11a, and in the conduit 18, it is possible to vary the relative position of the pistons of the actuators 10 and 11 with respect to the cylinders, thereby producing relative pivoting movement between the arms 13 and 14 of the attachment; this movement is used for variation of the transverse trim of the implement.

From a consideration of the hydraulic connection between the actuators 10 and 11 it will be seen that the actuator 10 has mainly a lifting function and the actuator 11 has mainly a transverse regulation function; therefore the actuator 10 will hereinafter be termed the "lifting" actuator, and the actuator 11, will be termed the "transverse regulation" actuator.

The lower chamber 10a of the actuator 10 is connected by a conduit 19 to the source of the fluid under pressure; the conduit 19 is connected to a transverse stabilisation arrangement generally indicated 20 and a lifting distributor generally indicated 21.

The upper chamber 10b of the actuator 10 and the lower chamber 11a of the actuator 11 can also be connected to the source of fluid under pressure by a conduit 22 which is connected between the conduit 18 and a transverse regulation distributor generally indicated 23; the conduit 22 has a branch 22a which is connected to the transverse stabilisation arrangement 20.

The actuator 17 which operates as a stay rod can also be connected to the source of fluid under pressure by a vertical regulation distributor generally indicated 24, via the conduits 71, 72.

THE LIFTING DISTRIBUTOR

The lifting distributor 21 comprises a valve body 25 having a so-called valve follower. The valve follower includes a sleeve 26 slidable in a bore in the valve body 25 and movable by the action of a lifting control lever 27. The sleeve 26 has a longitudinally extending bore within which slides a valve obturator 28 which is biased by a spring 29 and movable by a control arm 30, of a pivoted rocker 31 the other arm of which is pivoted to a drag link 32 connected to the lower arm 14 of the three-point coupling. In the valve body 25 there are two passageways 33, and 34 which both communicate, through respective orifices 35 and 36 of the sleeve, with the internal bore of the sleeve and with each other through a non-return valve 37.

The valve body 25 is also provided with a bore which guides a further valve obturator 38 which is biased by a spring 39 the force of which can be adjusted by means of an adjustment lever 40. The valve obturator 38 is movable to permit or prevent communication via an orifice 41 between the bore of the sleeve 26 and a discharge passageway 42 which leads to a discharge chamber 45. The passageway 33 mentioned above is connected to the conduit 19 and the passageway 34 is connected to the source of fluid pressure via the obturator of the lifting distributor 24, (which will be described in more detail below), a conduit 43, the transverse regulation distributor 23 and a conduit 44.

The valve body 25 includes a further discharge chamber 46 which communicates with the other discharge chamber 45, and which is connected to a recycling conduit 47 and, via a non-return valve 37a to the passageway 33. To the control lever 27 there is pivoted a drag link 27a which has an enlarged end slidable in a sleeve 27b which is connected to a valve obturator 26a which is biased by a spring to a position where it blocks communication of a branch conduit 22b with the discharge cavity 45. The sleeve 27b provides a measure of lost motion in the connection between the lever 27 and the valve obturator 26a so that the obturator 26a is displaced only when the lever 27 is moved beyond the maximum position of normal control of the actuators to connect the actuators 10, 11 to the discharge chamber effectively disconnecting them from the source of fluid under pressure and allowing the implement to rest on the ground under its own weight in an uncontrolled or 'floating' manner.

THE TRANSVERSE STABILISATION DISTRIBUTOR

The transverse stabilisation distributor, generally indicated 20, includes a valve body 48 with a first chamber in which there is a slidable valve obturator 50 biased by a spring 49. The obturator 50 is arranged such that its movement in the valve chamber is controlled automatically by the difference between the biasing force of the spring and the resultant pressure on its faces. The chamber controlled by the obturator 50 is connected in the conduit 19 in series with a second chamber of the valve body 48 fluid flow through which is controlled by an obturator 51. The obturator 51 is biased by a spring 52 to a position where it opens communication in the conduit 19 and is movable to intercept such communication by fluid pressure from a conduit 53a which, in turn, is controlled by the obturator 50. A conduit 53 leads from the top chamber 11b of the actuator 11 through the valve body 48, where it can be intercepted by the obturator 50, and thence through the transverse regulation distributor 23 by means of which the pressure can be discharged into a discharge chamber 45 via a discharge line 60 when a suitable connection is made by the transverse regulation distributor 23. The obturator 50 is also subjected to the pressure of the hydraulic fluid which circulates in the branch 22 of the conduit 18 which joins the top chamber 10b to the bottom chamber 11a. Two spring loaded ball valves 54, 55 are also provided, one on the conduit 19 and the other on the conduit 53.

THE TRANSVERSE REGULATION DISTRIBUTOR

The transverse regulation distributor 23 comprises a valve body 56 having a central bore within which slides a valve obturator 57 the position of which is controlled by operation of a transverse regulation control lever 58. The obturator 57 is movable to permit or prevent fluid flow through orifices 44a and 43a respectively, to control fluid flow along the conduits 43 and 44 respectively. The valve obturator 57 also has an internal distributor chamber 59 having orifices 59a by means of which connection between the delivery conduit 44 and the branch conduit 22 the conduit 43 being intercepted when the orifice 59a is brought into alignment with the conduit 22 to establish communication between the conduit 22 and the conduit 44. The obturator 57 also effects connection between the conduit 60 which leads to the discharge chamber 45 of the lifting distributor 21, and the conduit 53 for discharge of the actuator 11.

The lever 58 is pivoted at an intermediate point and is guided by a first graduated sector 61 which provides an indication of the desired transverse trim of the implement. With the sector 61 there cooperates an index carried by a movable sector 62 which is connected by a drag link 63, a bell crank 64 and a rocker 65 to the drag link 32 of the arm 14. The rocket 65 is connected by a rocket 66 to a corresponding drag link 32a of the arm 13. The bell crank 64 and the rocket 65 are attached to fixed points on the tractor.

The mechanical arrangement of the linkages is such that the relative angular displacement of the arms is reproduced in the form of angular displacement of the pivoted sector 62 with respect to a central reference point of the fixed sector 61 to provide an indication of the actual transverse trim of the implement.

The movable sector 62 is provided with a transverse flange within which there is a slot 62a through which projects the lever 58. The purpose of the slot 62a is to limit the movement of the lever 58 and consequently restrict the movement of the valve obturator 57 to be within limits compatible with the instantaneous inclination of the implement, thereby avoiding the possibility that an operator may place excessive strain on the joints of the arms of the three-point attachment by too great a movement of the lever which would cause unacceptably high hydraulic forces.

The vertical regulation distributor 24 comprises a valve body 67 having a discharge chamber 67a and a bore within which slides a valve obturator 68 the position of which is controlled by the action of a control lever 69. The obturator 68 has an orifice 70 which can be aligned selectively with either of the conduits 71, 72 which respectively connected to the upper chamber 17b and to the lower chamber 17a of the actuator 17 to connect one or the other of the delivery conduit 43.

The obturator 68 has a further orifice 73 by means of which delivery to the conduit 34 can be controlled in dependence on the position of th obturator. Communication between the delivery conduit 43 and the conduit 34 is in fact intercepted when the obturator 68 is moved by the lever 69 to bring its orifice 70 into alignment with one or other of the conduits 71 or 72 so that feeding of these conduits is alternative with the feeding of the conduit 34.

The valve body 67 includes also a differential manometric device 74 which cntrols the forces exerted by the jack 17. The device 74 comprises a pair of pistons 75, 76 which are respectively subjected to the pressure of the fluid in the conduits 71 and 72. The pistons act in opposition on a balancing lever 77 which, in its turn, acts through a mechanical linkage (not shown) on the finger 30 which controls the position of the valve follower 28 of the lift distributor 21.

OPERATION

With reference to the above description, the operation of the embodiment is as follows:

For straightforward raising of an implement the fluid under pressure is fed through the valves of he lifting distributor 21, the conduit 19 and the transverse stabilisation distributor 20 to the lower chamber 10a of the lifting actuator 10. The pressure of the fluid is exerted on the base of the piston of this actuator causing it to rise so that a volume of fluid is transferred from the top chamber 10b of the actuator 10 to the lower chamber 11a of the transverse regulation actuator 11; the top chamber 11b of the actuator 11 is connected in this position through the conduit 53, the valve obturator 50 of the transverse stabilisation distributor 20, the transverse regulation distributor 23 and the conduit 60, to the discharge chamber 45.

Thus as the piston of the actuator 10 is raised contemporaneous lifting of the piston of the actuator 11 occurs. During this lifting phase, the conduit 22 is blocked by the obturator 57 of the transverse regulation distributor 23 so that the same pressure of fluid which exists in the actuator chambers 10b and 11a will also act, via the branch 22a upon the obturator 50 of the transverse stabilisation distributor 20 thereby holding it against the biasing spring 49 in a position which allows fluid flow through the conduit 19.

Figure 3:
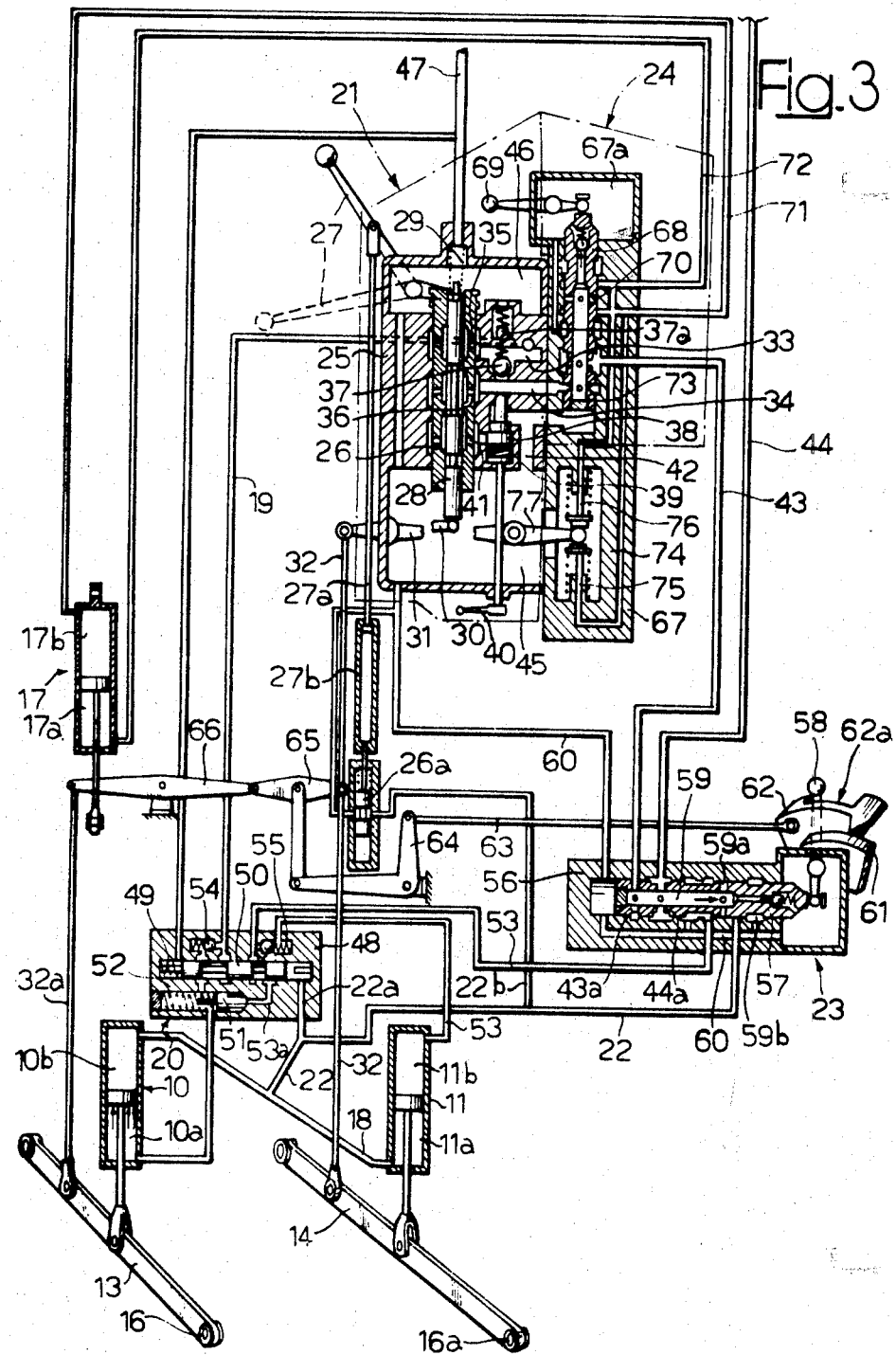
FIG. 3 is a schematic hydraulic circuit diagram of the control circuit of the embodiment of the invention.
Figure 4:
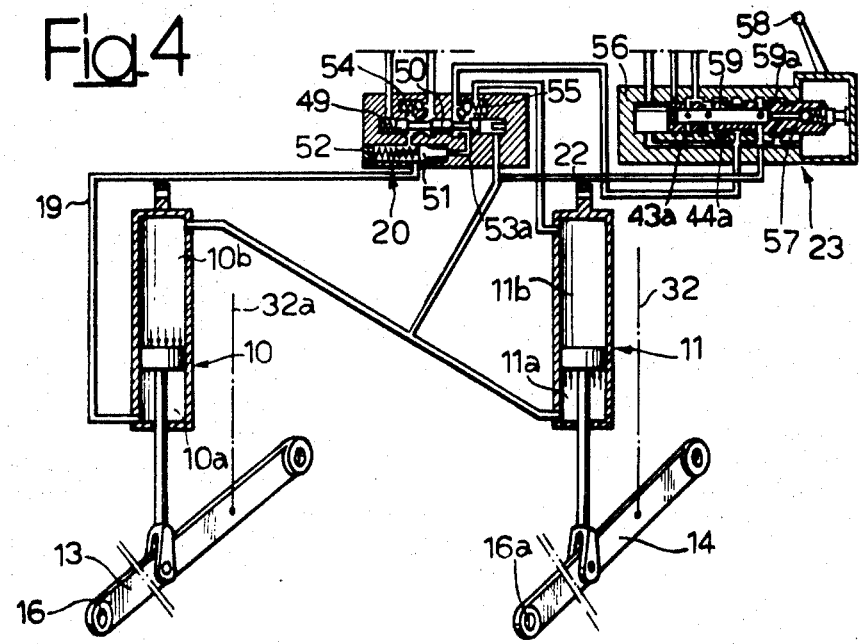
FIGS. 4 and 5 are partial schematic hydraulic circuit diagrams which illustrate the different positions of parts of the embodiment during operation to adjust the transverse inclination of an agricultural implement connected thereto.
Figure 5:
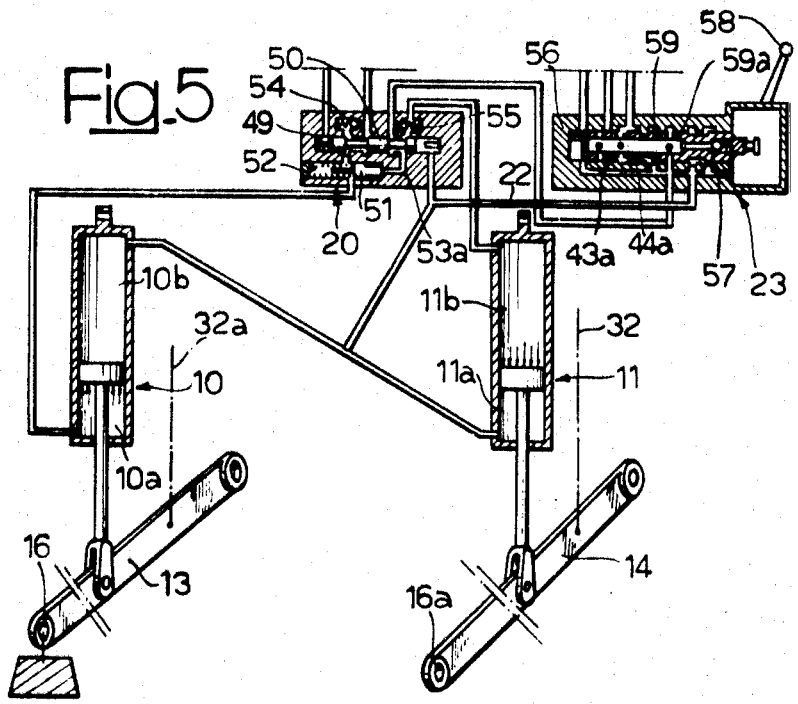

The lifting action is controlled by the lever 27: this causes displacement of the sleeve 26 to allow communication between the conduit 34 and the orifice 41 (as shown in FIG. 3) so as to force the valve obturator 38 to the closed position thereby blocking the discharge conduit 42; the passage of fluid from the conduit 34 to the conduit 33 being allowed by opening of the non-return ball valve 37. Upward displacement of the arm 13 and 14, however, causes displacement of the valve follower 28 due to the movement of the mechanical linkage connected to the drag links 32, and 32a. Displacement of the valve follower 28 will eventually bring it to a position where it intercepts the passage of fluid through the orifice 41; this occurs after a displacement determined by the amount of movement of the lever 27. The valve obturator 38 will then be subject to the reverse thrust of the fluid contained in the conduit 34 and will thus move against the action of the biasing spring 39 to allow communication between the conduit 34 and the discharge passageway 42. The valve 37 then closes and supply of fluid to the conduit 19 ceases.

The arms 13 and 14 will then be in a position which corresponds to the position of the lever 27. Any subsequent upward displacement of the lever 27 will, of course, cause a corresponding upward displacement of the arms 13 and 14, there being a direct correspondence between the position of the lever 27 and the position of the arms 13 and 14 at rest.

By moving the lever 27 beyond the upper limit of its normal movement the lost motion between the rod 27a and the sleeve 27b is taken up and the valve obturator 26a is displaced to connect the conduit 22b to the discharge chamber 45.

Since the sleeve 26 and the obturator 28 are in the irrespective discharge positions with the valve obturator 38 thrust into the position, and since the pressure of fluid in the conduit 22 is zero, the pistons of the actuators will be able to move freely and independently in either direction in their cylinders; the conduit 19 communicating with the discharge chamber 45 through the conduit 33, sleeve 26, conduit 34, valve 38 and the passageway 42.

In order to effect lowering of the implement the chamber 10a is connected to the discharge chamber and the weight of the implement drives the fluid contained in the lower chamber 10a of the actuator 10 into the discharge chamber.

For this purpose the sleeve 26 of the distributor 21 is moved to the bottom of its travel so that the valve follower 28 interrupts the connection between the conduit 34 and the orifice 41. The obturator 38 is consequently caused to open and connects the conduit 34 with the discharge chamber 45.

Discharge of the fluid from the lower chamber 10a of the actuator 10 occurs through the conduit 19 and the valve 37a. The top chamber 11b of the actuator 11 is connected to the discharge chamber and therefore draws in the hydraulic fluid enabling lowering of the piston of the actuator 11. The fluid contained in the chambers 10b and 11a remains under pressure and, through the conduit 22, maintains the valve obturator 50 in the position enabling discharge of the fluid through the conduit 19. It should be noted that displacement of the obturator 38 occurs against the action of the spring 39, which ensures the presence of a reduced pressure, called the pilot pressure, within the conduit 34. By adjusting the lever 40 it is possible to adjust this pressure by varying the pressure exerted by the spring 39. This allows the so-called load transfer to be obtained. This consists, as described above, in providing the lifting actuator 10 with a hydraulic pressure which is not sufficient for the actuator to lift the implement but which transfers to the tractor a load dependent on the hydraulic pressure thus provided.

By moving the lever 58 of the transverse regulation distributor 23 to displace the obturator 57 to put its orifice 59a into communication with the conduit 22 a delivery of fluid is caused to arrive through the conduit 22 to the top chamber 10b of the lifting actuator 10, and to the lower chamber 11a of the transverse regulation actuator 11. The pressure of fluid in the conduit 22 maintains the valve obturator 50 in a position compatible with discharge of the chambers 11b and 10a such that the piston of the actuator 11 is able to move upwards and that of the actuator 10 is able to move downwards to effect adjustment of the trim of the implement. The obturator 57 moreover intercepts the delivery to the conduit 43 thereby excluding the distributors 21 and 24. On the other hand when the lever 58 is displaced so as to bring the orifice 59a of the obturator 57 into alignment with the conduit 53 there is a delivery of fluid under pressure to the top chamber 11b of the actuator 11, pressing it downwards. In this position of the obturator 57, the conduit 22 is connected to the discharge chamber 45 through an annular recess 59b of the obturator 57 and the conduit 60. Whenever an external force impedes the descent of the actuator 11, the increase in pressure opens the valve 51 and hydraulic fluid flows into the chamber 10a to increase the force exerted.

Adjustment to the length of the stay rod actuator 17 is obtained by moving the lever 69 of the distributor 24 to bring the orifice 70 of the obturator 68 into alignment with the conduit 71. This causes a delivery of fluid to the top chamber 17b of the actuator 17; the chamber 17a is connected to the discharge chamber 67a through the conduit 72 and the corresponding orifices of the obturator 68. To effect shortening, on the other hand, the lever 69 is moved so as to displace the obturator 68 to bring its orifice 70 into alignment with the conduit 72. This causes a delivery of fluid under pressure to reach the chamber 17a of the actuator 17 thereby causing a displacement of the piston; the chamber 17b is now connected to the discharge chamber 67a through the conduit 71 and the corresponding orifices of the obturator 68.

Figure 6:
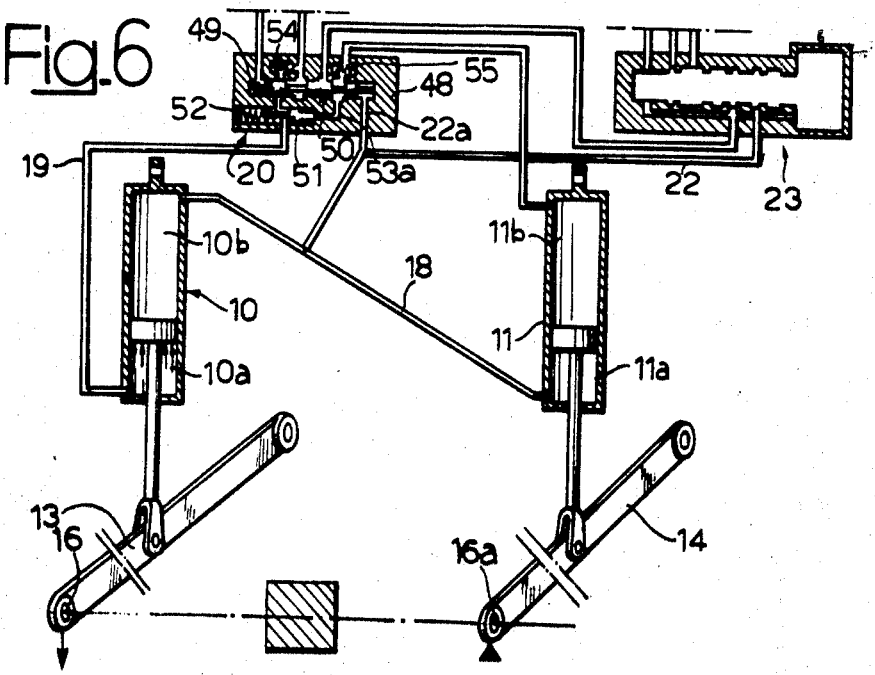
FIGS. 6 and 7 are partial schematic hydraulic circuit diagrams which illustrate the different positions of parts of the embodiment of the invention during operation to automatically control the transverse stability of an agricultural implement connected thereto.
Figure 7:
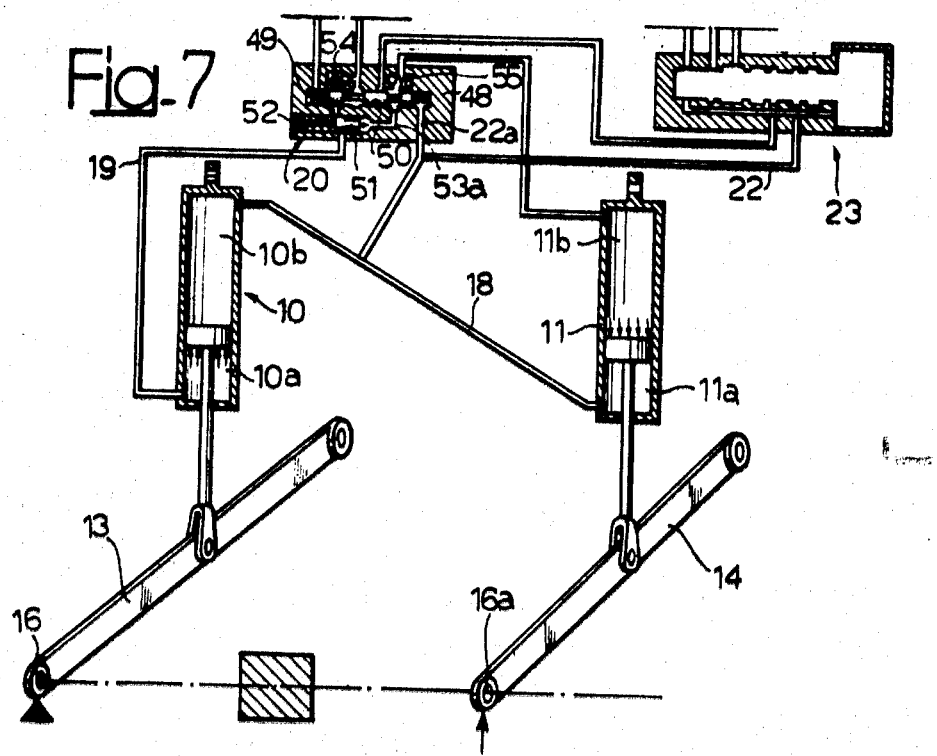

The transverse stabilisation distributor 20 operates automatically to prevent the implement from departing from the desired transverse inclination either due to the effect of external forces, either dynamic or induced by contact with the ground, or by reason of any asymmetry in the geometry of the implement itself, such as the barycentre being displaced to one side with respect to the longitudinal axis of symmetry of the tractor/implement combination. This automatic intervention occurs, for example, if there is a load situated, as shown in FIG. 6, such that the arm 13 is urged downwardly whilst the arm 14 is merely supported.

In these conditions the distributor 20 intervenes to interrupt the conduit 19 thereby preventing or impeding the connection to the discharge chamber of the lower chamber 10a of the actuator 10. This occurs due to the fact that, by lowering the pressure in the conduit 22, the fluid pressure on the valve obturator 50 reduces so that the spring 49 can now move it towards the right of the drawing, thereby interrupting the conduit 19. As the actuator 10 is practically locked the trim condition of the implement is assured.

Similarly, if there is a load situated such that the arm 14 is forced upwards and the arm 13 is merely supported, then cancellation of the pressure in the conduit 22 will produce displacement toward the right of the obturator 50 which thereby interrupts the conduit 19 and opens the branched conduit 53a.

Consequently the pressure of fluid in the chamber 11b of the actuator 11 acts upon the further valve obturator 51 displacing it against the action of the spring 52 to allow communication between the conduit 53 and the branch of the conduit 19 which connects the chamber 10a to the stabiliser arrangement 20.

The pistons of the actuators 10 and 11 will thus be subjected to equal and opposite pressure, but remain locked to ensure the trim of the implement.

Description of the manner of operation of the arrangement has been made with reference to a specific circuit arrangement but it is evident that whilst the principle of this invention remains firm, numerous details of construction may be widely varied without thereby departing from the scope of this invention.

I claim:

1. A control device for a three point coupling arrangement of an agricultural tractor, comprising two lower arms carrying two points of said three point coupling arrangement, said arms being pivotally connected at one end to the rear of said tractor,
   first and second hydraulic actuators on said tractor,
   means connecting said first and second hydraulic actuators to said pivoted lower arms to control the angular position of said lower arms,
   a third hydraulic actuator on said tractor carrying a third connection point of said three point coupling arrangement,
   means connecting said first and second actuators hydraulically in series such that movement of either of said actuators causes a transfer of fluid from one to the other to cause the other of the said first and second actuators to move in the same direction,
   means in fluid communication with said connecting means for varying the volume of fluid transferred from one said actuator to the other whereby the relative inclination of said lower arms is adjustable,
   a source of hydraulic pressure, and
   independent distributor valve means connected between said hydraulic actuators and said source of hydraulic pressure.

2. The control device of claim 1 wherein said first actuator has a lower chamber and an upper chamber separated by a piston,
   transverse stabilisation distributor valve means and lifting distributor valve means selectively connecting said lower chamber of said first actuator to said source of fluid pressure.

3. The control device of claim 1 wherein said means connecting said first and second actuators hydraulically in series comprises a conduit having at least one branch thereto,
   transverse regulation distributor valve means selectively connecting said at least one branch of said connecting conduit to said source of hydraulic pressure.

4. The control device of claim 3 wherein said transverse stabilisation distributor valve means includes means sensitive to the fluid pressure in said connecting conduit between said first and second hydraulic actuators.

5. The control device of claim 2 wherein said lifting distributor valve means includes a valve follower arrangement comprising:
   a valve body having a bore therein,
   a sleeve slidable within said bore in said valve body,
   a first control lever controlling the position of said sleeve in said bore,
   means connecting said bore to said first and second actuators whereby said sleeve controls the delivery of fluid to said first and second hydraulic actuators,
   a valve obturator slidable within said sleeve, and
   means connecting said valve obturator to said lower arms controlled by said first and second hydraulic actuators whereby said valve obturator is moved to follow the movement of said sleeve upon movement of said lower arms determined by said movement of said sleeve.

6. The control device of claim 5 wherein said valve body of said lifting distributor valve means has two first fluid passageways,
   a non-return ball valve connecting said two first fluid passageways in said valve body of said lifting distributor valve means,
   two orifices in said sleeve connecting respective ones of said first fluid passageways to the internal bore of said sleeve,
   a second fluid passageway in said valve body of said lifting distributor valve means communicating with said bore in said valve body and a discharge chamber *via* a discharge passageway, and
   further valve obturator means slidable in said valve body to open or close said second fluid passageway.

7. The control device of claim 6 wherein said further valve obturator means is biased by adjustable spring biasing means, said spring biasing means controlling the pressure at which said further valve obturator means moves to open said second fluid passageway to allow communication between said internal bore of said sleeve and said discharge passageway.

8. The control device of claim 5 wherein there are lost motion coupling means coupling said first control lever to release valve means,
means resiliently biasing said release valve means to a closed position to control the connection of said interconnected chambers of said first and second hydraulic actuators to said discharge chamber when said first control lever is moved to take up said lost motion and open said release valve means against the action of said resilient baising means.

9. The control device of claim 3 wherein said transverse regulation distributor valve means comprises a valve body,
a bore in said valve body,
a valve obturator slidable in said bore in said valve body,
a second control lever, means connecting said second control lever to said valve obturator in said valve body of said transverse regulation distributor valve means,
means connecting said bore in said valve body to said source of fluid pressure,
means connecting said bore in said valve body to said intercommunicating chambers of said first and second hydraulic actuators, and
means connecting said bore in said valve body to said lifting distributor valve means, said second control lever being movable to move said valve obturator to connect said intercommunicating chambers of said first and second hydraulic actuators to said source of fluid pressure or to connect said lifting distributor to said source of fluid pressure.

10. The control device of claim 9 wherein there is provided a fixed graduated sector adjacent said second control lever,
a pivoted sector having indicator means adjacent said graduated scale, and
means connecting said indicator means to said lower arms whereby the position of said indicator means along said graduated sector indicates the relative position of said lower arms.

11. The control device of claim 10 wherein said means connecting said indicator means to said lower arms comprise:
a pivoted sector carrying said indicator means,
a drag link connected to said pivoted sector,
a bell crank connected to said drag link and mounted on a fixed part of said tractor,
a first rocker mounted on one arm of said bell crank,
a second pivoted rocker, a first arm of said second pivoted rocker being connected to a first arm of said first rocker, said second rocker being mounted on a fixed part of said tractor, and
respective drag links connected between said lower arms and said second arms of said first and second rockers,
said pivoted sector having a slot therein, said second control lever extending through said slot whereby the movement of said second control lever is restricted by the instantaneous position of said pivoted sector.

12. The control device of claim 1 wherein one of said independent distributor valve means connected between said hydraulic actuators and said source of hydraulic pressure is a vertical regulation distributor valve means comprising:
a valve body,
a bore in said valve body,
a valve obturator sliding in said bore in said valve body,
a third control lever, means connecting said third control lever to said valve obturator,
means connecting said bore in said valve body to said lifting distributor valve means,
means connecting said bore in said valve body to said source of fluid pressure,
means connecting said bore in said valve body to said chambers of said third hydraulic actuator, said third control lever being movable to move said valve obturator connected thereto to selectively effect connection between said source of fluid pressure and a selected one of said chambers of said third hydraulic actuator or between said source of fluid pressure and said lifting distributor valve means.

13. The control device of claim 12 wherein said valve body includes a differential manometric device, means connecting said differential manometric device to said third hydraulic actuator whereby said differential manometric device is sensitive to the pressure in the chambers of said third hydraulic actuator and responsive to adjust the lifting distributor valve means to control the force exerted by said third hydraulic actuator.

14. The control device of claim 2 wherein said transverse stabilisation distributor valve means comprises:
a valve body,
first and second bores in said valve body,
first and second valve obturators sliding in said first and second bores respectively,
first means resiliently biasing said first valve obturator to a first position in said first bore,
means connecting said first bore to said conduit interconnecting said first and second hydraulic actuators such that the pressure in said intercommunicating chambers of said first and second hydraulic actuators opposes the said first biasing means to move said first valve obturator to a second position, when said pressure in said intercommunicating chambers is greater than the force exerted by said first resilient biasing means,
means connecting said second bore to said upper chamber of said second hydraulic actuator,
second resilient biasing means biasing said second obturator to a first position, said pressure in said upper chamber of said second hydraulic actuator opposing said second resilient biasing means to move said second valve obturator to a second position when said pressure is greater than the force exerted by said second biasing means,
means connecting said first bore to said second bore and said first bore to said source of fluid pressure,
means connecting said second bore to the lower chamber of said first hydraulic actuator, said first valve obturator allowing the passage of fluid from said source of fluid pressure to said lower chamber of said first hydraulic actuator when in said second position and preventing such communication when in said first position, means connecting said upper chamber of said second actuator to said first bore, said first and second obturators allowing connection of said upper chamber of said second hydraulic actuator to said lower chamber of said first hydraulic actuator when said first obturator is in said first positions, and said second obturator is in said second position.

15. The control device of claim 14 wherein said first obturator intercepts said means connecting said source of pressure to said lower chamber of said first actuator when said first obturator is in said first position to which it is biased upon a reduction of fluid pressure acting on it from said intercommunicating chamber of said first and second hydraulic actuators resulting from a downward force on said arm connected to said first actuator greater than the downward force on said second actuator.

16. The control device of claim 14 wherein said second valve obturator is movable to said second position where it allows communication between said upper chamber of said second actuator and said lower chamber of said first actuator when there is a resultant upward force on said arm connected to said second actuator.

* * * * *